United States Patent Office 2,977,718
Patented Apr. 4, 1961

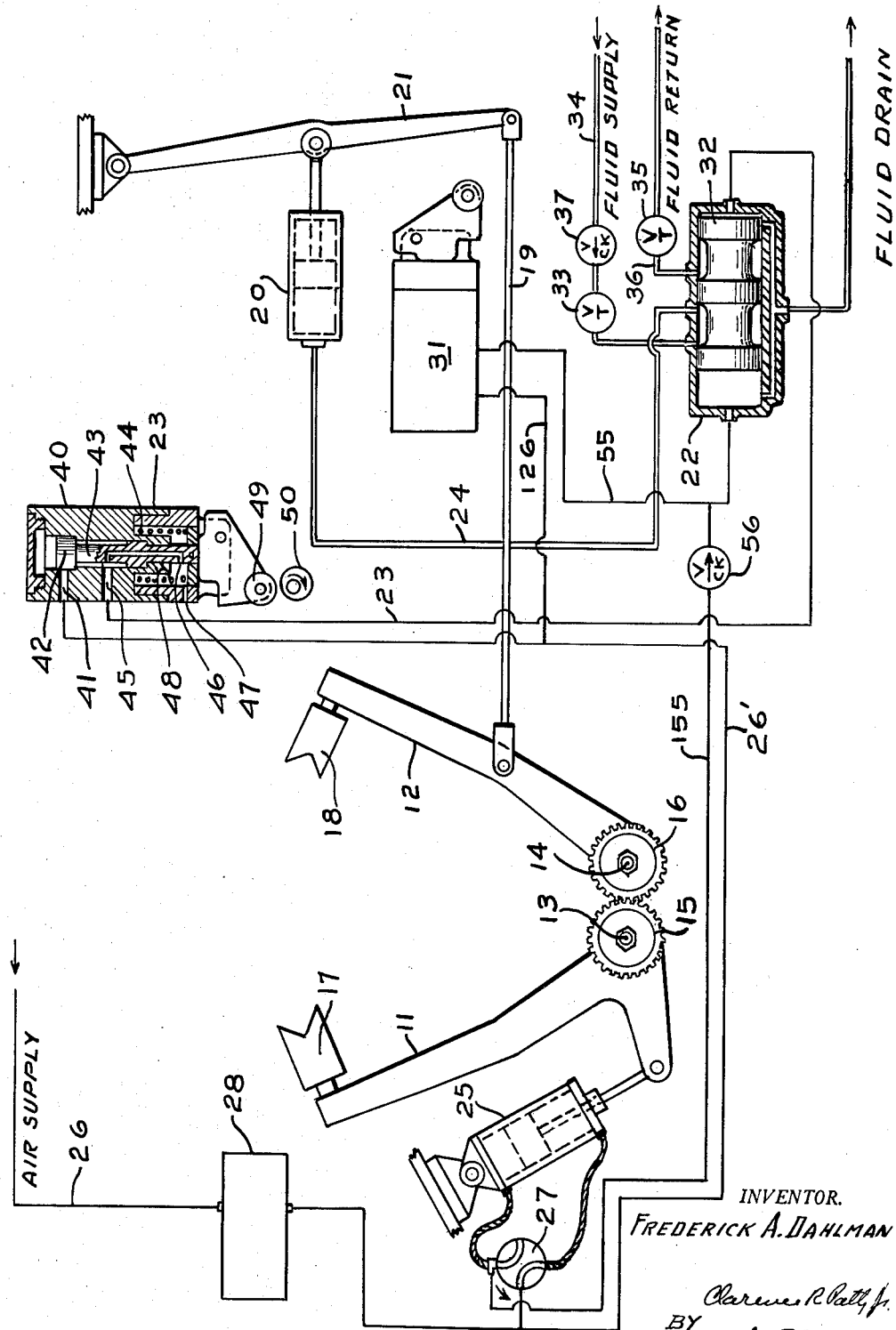

2,977,718
GLASS FEEDER SHEAR MECHANISM ACTIVATING MEANS

Frederick A. Dahlman, Corning, N.Y., assignor to Corning Glass Works, Corning, N.Y., a corporation of New York Filed Oct. 8, 1958, Ser. No. 765,964
8 Claims. (Cl. 49—14)

The present invention relates generally to improvements in means for activating shear mechanisms for use in conjunction with glass feeders of the type used to form suspended molten glass mold charges. In suspended charge feeders, quantities of molten glass are periodically discharged at a controlled rate and in a preferred form from the lower portion of a spout section of a forehearth associated with a glass melting furnace. At predetermined times during the discharge of the molten glass from the spout, a shear mechanism is operated beneath the spout to sever individual charges or "gobs" from the pendent stream of discharging glass. These gobs may be directed thereafter to suitable molds in which the gobs may be fabricated into articles by any of a number of forming processes well known in the art.

One type of shear mechanism that has found widespread use in the art is disclosed in U.S. Patent No. 1,760,435 for a Shear Mechanism For Glass Feeders, issued to Karl E. Peiler on May 27, 1930. In this type of shear mechanism, a pair of pivoted movable arms are swung with opposed synchronized motions in a horizontal plane beneath a discharge orifice of a forehearth spout. The arms carry shear blades that mutually contact immediately below the discharge orifice and co-act to sever mold charges from glass issuing from the orifice. As disclosed in the above-mentioned patent, a pair of tension coil springs effect the shearing stroke, under the control of a cam employed to effect the return stroke of the shears, which are driven by a linkage coupled with the drive of a feeder needle whose operations are appropriately synchronized with the movements of a forming machine to which successively formed charges or gobs are to be fed.

It will be immediately evident that in such an arrangement the speed of operation of the shears in both their cutting stroke and in their return stroke are dependent upon the frequency of the formation of the successively formed gobs. It is therefore obvious that when the gobs are formed at widely spaced intervals the shear operations will be sluggish and accordingly the shear blades will thus remain in contact with the charge or gob and with the pendent glass for objectionable time periods.

According to the invention the cam formerly employed to effect the return stroke of the shear blades and the springs formerly employed to close them under control of such cam are replaced with hydraulic and pneumatic cylinders, respectively. The hydraulic cylinder is placed under the influence of a pneumatically operated hydraulic valve under the joint control of the shear operating mechanism and a timing device operated independently of the facilities employed to operate the charge or gob forming plunger. The pneumatic cylinder is arranged to continuously tend to move the shear blades to their closed position and the hydraulic cylinder is activated by fluid supplied through the hydraulic valve to open them. When the shear blades close, a pivot valve is tripped to reverse the position of the spool or slide of the hydraulic control valve and thus cause it to move to a position that connects the hydraulic cylinder to the fluid return line, thus permitting the pneumatic cylinder to close the shear blades. By proper adjustment of throttle valves in the fluid supply and return lines, the speed of the opening and closing strokes of the shear arms are easily regulated as desired. Also, according to the invention, a valve is provided for enabling use of the pneumatic cylinder to move the shears to their open position and to so hold them when it is desired to discontinue feeding operations.

For better understanding of the invention reference is hereinafter made to the accompanying drawing diagrammatically depicting the invention as applied to a conventional form of glass charge or gob shearing mechanism.

As viewed, left and right-hand shear arms 11 and 12, respectively, are pivoted about vertical pivot pins 13 and 14, respectively. Secured to shear arms 11 and 12 are gears 15 and 16, respectively. These gears are in mesh and constrain the shear arms to swing in synchronized opposition motions in response to activating forces which will be described hereinafter. Shear blades 17 and 18 are secured to the arms 11 and 12 respectively and co-act during the closing or shearing stroke of the shear arms to sever a discharging glass stream issuing from a forehearth spout (not shown).

Closing movements of the shear arms are derived from a pneumatic cylinder 25 continuously supplied with operating fluid through a valve 27 in a line 26' extending from a surge chamber 28 in communication with an air supply line 26.

Opening movements of the shear arms are derived from a hydraulic cylinder 20, which is linked to a shear arm operating lever 21 corresponding to that of the referred-to prior art mechanism and therein operable in one direction by a cam and in the reverse direction by tension springs. As in such former mechanism, the lever has a shear arm operating link 19 extending to shear arm 12.

The cylinder 20 is alternately connected with a fluid supply line 34 and with a fluid return line 36 through a pneumatically operable slide valve 22 to alternately hydraulically open the shears and to permit the cylinder 25 to pneumatically close them respectively.

The movement of the slide 32 of valve 22 to permit the shear opening operation by cylinder 20 is under control of a pilot valve 31 operated by lever 21 at the instant the shear blades 17 and 18 arrive at a desired closed or near closed position.

The movement of valve slide 32 to disconnect the cylinder 20 from the fluid supply line 34 and for connecting it with the fluid return line 36 to permit the cylinder 25 to close the shears is under the control of a pilot valve 40, that is similar to valve 31, and operable by a timing cam 50.

Air from line 26' is supplied to an intake passage of valve 40 normally blocked from passage through the valve by a member 42 of a slide element 43 normally held in the position shown by a spring 44. On the other hand, at this time, a passage 45 connected to the right-hand end of valve 32 by a line 23 is connected to atmosphere via a slide passage 46 and a passage 47 in the valve housing. The slide 43 is moved upward when a slide activating roller 49 has enough pressure applied thereto, as by timing cam 50, to move the slide to the upper end of the valve housing. In such position housing portion 48 blocks passage 46, while member 42 opens a passage between passages 41 and 45, thus admitting operating air to the right-hand end of valve 22.

As previously stated the shear opening movements are permitted to start whenever the valve 31 is activated to move the spool 32 of valve 22 to the right as occurs at the instant that shear blades 17 and 18 arrive at a desired closed or near closed position. The air path through valve 31 to the left end of valve 22 extends from line 26' through its branch line 126, through valve 31, and a line 55 extending to the left end of valve 22. A check valve 56 in a connecting line 155 extending to valve 27 prevents air from passing directly to atmosphere via valve 27.

Throttle valves 33 and 35, respectively, in fluid supply and return lines 34 and 36, respectively, are employed to modify the rate of fluid flow therethrough to independently control the rate of movement of arms 11 and 12 in their shear closing or opening movements or in both such movements. A check valve 37 in line 34 serves to prevent pressure applied to the piston of cylinder 20 from driving fluid therefrom through valve 22 back into line 34.

It is sometimes desirable to open or hold the shear blades in their open position for prolonged time periods that may begin irrespective of their instant position, as for example when forming operations are to be discontinued for a time. To arrange for such operation, valve 27 is provided for cutting off the supply of air to the lower end of cylinder 25 and for directly feeding air from line 26' to the upper end of such cylinder, and via the line 155 and the check valve 56 to feed air to the left-hand end of valve 22 to move its spool 32 to the position in which fluid is also fed to cylinder 20 for the purpose of opening the shears in case such valve is not already in such position. Obviously so long as the valve 27 is in its alternative position air intermittently supplied to the right-hand end of the spool 32 will be ineffective to effect its movement to the left or shear closing position.

The normal operation of the apparatus may be briefly described as follows: When timing cam 50 moves the slide of valve 40 to its upper position air is supplied from line 26' through valve 40 and line 23 to the right-hand end of valve 22, thereby causing the spool 32 to move to its leftward position. In such position the line 24 extending from valve 22 to the cylinder 20 is connected with the fluid return line 36, thus permitting the cylinder 25 to close the shears. As will be evident during such operation lever 21 drives the piston of cylinder 20 to the left forcing the fluid therein to flow into the return line 36. Near the end of the shear stroke lever 21 engages the roller of valve 31 and moves its slide to its alternative position. Air supplied from line 26' is thereupon permitted to flow through branch line 126, valve 31 and line 55 to the left-end of valve 22 to effect the return of its slide to the position shown whereupon fluid is again supplied to cylinder 20 to immediately reopen the shears.

What is claimed is:

1. The combination with a shear mechanism for a glass feeder, of fluid operated activating devices linked to such mechanism, means for continuously supplying fluid to one of such devices to tend to move said mechanism from one position to an alternative position; a combined fluid supply and return line to the other of said devices including a two position control valve in which such line terminates, and having fluid supply and fluid return lines respectively associated therewith, said valve in its first position, feeding operating fluid from its supply line to the other of said devices and in its second position affording the return of fluid over the line from said other device to its associated fluid return line; time controlled means for positioning said control valve in its second position whereby said one device is enabled to move said mechanism to its alternative position and a valve operated as such mechanism arrives at its alternative position to restore said control valve to its first position whereby said other device is enabled to restore such mechanism to its initial position.

2. A combination such as defined by claim 1 wherein one of such devices comprises a pneumatic cylinder and the other fluid operated device comprises a hydraulic cylinder.

3. A combination such as defined by claim 2 wherein the pneumatic cylinder is arranged to move the mechanism in a direction to close the shears thereof.

4. A combination such as defined by claim 3 wherein the means for continuously supplying fluid to one of the devices comprises a fluid supply line extending to said control valve including a valve having a position in which it supplies fluid directly to said control valve to move it to its first position, whereby the other of said devices is continuously supplied with operating fluid to maintain said mechanism in a position in which the shears thereof are held open independently of said time controlled means.

5. A combination such as defined by claim 1 wherein the fluid return passage includes a valve for regulating the rate of activation of said mechanism by one of said fluid operated devices.

6. In combination in a shear operating mechanism wherein a pair of movable arms are swung with opposed synchronized motions in a horizontal plane beneath a discharge orifice of a forehearth spout to shear suspended gobs from a stream of molten glass issuing therefrom, a first linkage for swinging such arms toward one another embodying a pneumatic cylinder, a second linkage for swinging such arms away from one another embodying a hydraulic cylinder, means for continuously supplying air to the pneumatic cylinder, a control valve for feeding fluid to said hydraulic cylinder from a suitable operating fluid supply source and for affording a path for the return of fluid from said cylinder through such valve to such source, a timing device under whose control said control valve is activated from an initial position in which it directs operating fluid into said hydraulic cylinder to a position in which it affords a passage for the return therefrom of fluid to such source during a movement imparted to such hydraulic cylinder by said pneumatic cylinder, and means activated by said first linkage during the latter portion of its movement by such pneumatic cylinder to effect the return of said control valve to its initial position.

7. A combination such as defined by claim 6 wherein throttle valves are arranged between said control valve and its fluid supply source and in the fluid return path through such control valve, whereby the rate of movement of said hydraulic cylinder in either direction may be regulated.

8. In combination in a shear mechanism for a glass feeder, a pneumatically operable cylinder linked to said mechanism, a manually operable valve positionable to feed operating fluid to either end of said cylinder, a hydraulic cylinder linked to said mechanism, an air operated hydraulic fluid control valve included in operating fluid supply and return paths extending to such hydraulic cylinder for operating said mechanism to open the shears thereof and to effect their closure by said pneumatic cylinder respectively, time controlled means for operating said latter valve to connect said hydraulic cylinder to the fluid return path, means for operating said latter valve to reconnect said hydraulic cylinder with the fluid supply path, and an air supply line to the air operated hydraulic fluid control valve for positioning it to continuously supply operating fluid to said hydraulic cylinder whenever said manually operable valve is in a position to supply fluid to one end of the pneumatic cylinder.

References Cited in the file of this patent

UNITED STATES PATENTS

| 1,760,435 | Peiler | May 27, 1930 |
| 1,950,339 | Barker | Mar. 6, 1934 |
| 2,472,560 | Avery | June 7, 1949 |
| 2,678,519 | Honiss | May 18, 1954 |